United States Patent [19]

Terashita

[11] Patent Number: 4,707,119
[45] Date of Patent: Nov. 17, 1987

[54] PHOTOGRAPHIC PRINTER

[75] Inventor: Takaaki Terashita, Kaisei, Japan

[73] Assignee: Fuji Photo Film Co., Ltd., Minami-Ashigara, Japan

[21] Appl. No.: 937,471

[22] Filed: Dec. 2, 1986

Related U.S. Application Data

[63] Continuation of Ser. No. 768,233, Aug. 22, 1985, abandoned.

[30] Foreign Application Priority Data

Aug. 31, 1984 [JP] Japan ................... 59-182207

[51] Int. Cl.$^4$ ............................................. G03B 27/73
[52] U.S. Cl. ........................................ 355/38; 355/68; 358/76
[58] Field of Search ............................ 355/38, 68, 77; 356/404, 443; 358/76

[56] References Cited

U.S. PATENT DOCUMENTS

| | | | |
|---|---|---|---|
| 3,947,110 | 3/1976 | Yamada | 355/68 X |
| 4,094,604 | 6/1978 | Payhammer et al. | 355/68 |
| 4,235,551 | 11/1980 | Harvey | 355/38 |
| 4,339,517 | 7/1982 | Akimoto | 355/38 X |
| 4,364,084 | 12/1982 | Akimoto et al. | 358/76 |
| 4,583,186 | 4/1986 | Davis et al. | 355/77 X |
| 4,589,766 | 5/1986 | Fürsich et al. | 355/38 |

FOREIGN PATENT DOCUMENTS

| | | |
|---|---|---|
| 2637180 | 3/1977 | Fed. Rep. of Germany ........ 355/68 |
| 54-28131 | 3/1979 | Japan . |
| 56-62243 | 5/1981 | Japan ..................................... 355/77 |
| 56-83733 | 7/1981 | Japan . |

OTHER PUBLICATIONS

Eastman Kodak Research Disclosure, Nov. 1974, pp. 24–26, Tone Correction Apparatus for Color Analyzers.

Primary Examiner—L. T. Hix
Assistant Examiner—D. Rutledge
Attorney, Agent, or Firm—Wenderoth, Lind & Ponack

[57] ABSTRACT

The exposure in color printers has heretofore been determined generally by LATD, but the quality of resulting prints is not always satisfactory. There have been proposed various improvements by making an operator visually inspect a negative film at a former stage of LATD measurement so as to correct the data from LATD or by scanning a frame of film for automatic judgement. They, however, are not quite satisfactory in quality, either. This invention printer allows unskilled operators to attain a high acceptance rate in printing due to the effect by an automatic judgement section as well as enables skilled operators to achieve printing at higher quality and higher acceptance rate.

10 Claims, 16 Drawing Figures

PHOTOGRAPHIC PRINTER

This application is a continuation of application Ser. No. 768,233, filed Aug. 22, 1985, now abandoned.

BACKGROUND OF THE INVENTION

This invention relates to a photographic printer, and more particularly to a photographic printer which allows anyone without skill to correct the exposure of images and determine the optimal exposure for printing.

Figure 1:
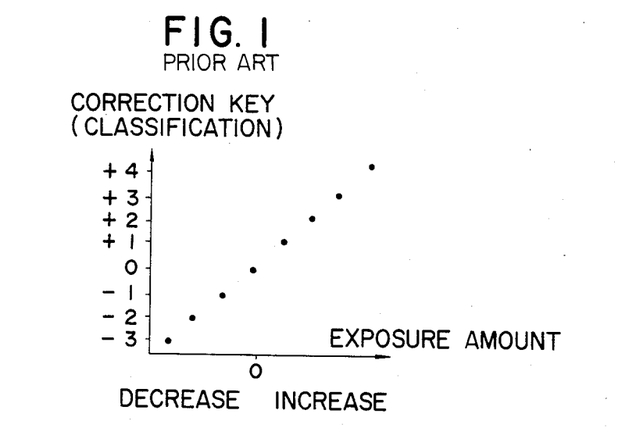
FIG. 1 is a view used to explain the prior art method for determining printing exposure.

The exposure for printing a color film is generally determined by the LATD (large area transmittance density). With the LATD method, however, the yield of producing satisfactory printing is about 70%. It is therefore necessary for an operator to visually inspect a film negative prior to the LATD measurement (either at a preliminary inspection apparatus or at an exposure opening of the printer before exposure), and determine an amount necessary to correct the LATD-measured exposure (usually with a density key, color key, function key, color correction key, etc.) judging from the relationship between the main objects and background or from patterns thereof he/she empirically learned so that both amounts may be summed up so as to perform printing with an optimal exposure. FIG. 1 shows an example of the relationship between correction keys and corresponding exposure amounts. This conventional method, however, suffers detriments as the operators require much experience and several years of skill, and the quality of printing consequently fluctuates depending on the operators or working conditions. Even if an operator has accumulated enough skill after long training, he/she may retire or leave the shop, giving another difficulty to the management. A better method has been sought in the field.

Figure 2:
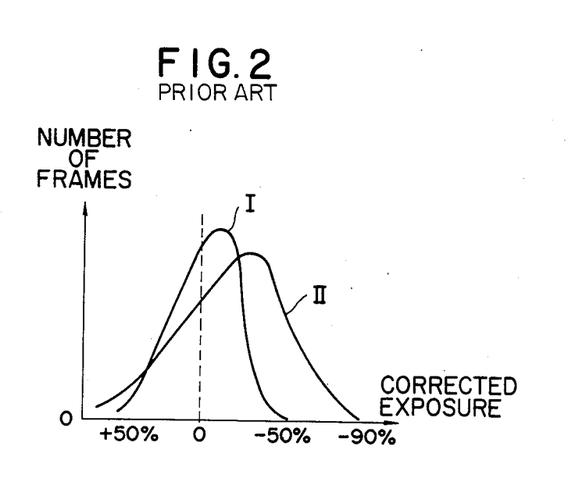
FIG. 2 is a graph used to show the difference in correction amounts between skilled and unskilled operators.

Using the conventional method and sampling a large number of operators, both skilled and unskilled, a survey was conducted to measure deviations from the preset optimal correction caused by skilled operators and by unskilled operators. The result reveals that the deviation widely fluctuates even among skilled operators depending on image patterns or on individuals. As shown in FIG. 2, about 98% of the judgements made by skilled operators are distributed in the range of ±50% from the optimal correction amount (0%) while that of the unskilled operators with 4 month's experience range ±70%. In FIG. 2, the curve I denotes the amount of exposure skilled operators judged necessary to correct LATD determined exposure and the curve II that judged by unskilled operators. The graph shows that, although both skilled and unskilled operators judged insufficient amount as the optimal value of correction, unskilled operators tend to judge more insufficient values as the optimal, resulting in defective printing quality. As the conventional method largely depends on individual experience and craftsmanship, only large-scale developing laboratories which can retain a large number of skilled operators can produce prints of high quality.

In order to solve these problems, there has been proposed an automatic exposure determining method comprising the steps of dividing a film frame into small picture elements, and photographically scanning them, and analyzing the thus obtained density values, and combining the analyzed values with data and determining the exposure. But the method is not quite satisfactory as the quality still fluctuates if the exposure is corrected fully automatically. Another method has been proposed to use human judgement by an operator in one way or another as an input to improve the above methods. For example, Japanese Laid-open Patent No. 150336/1976 proposed a method wherein density failure or over- or under-exposure is determined visually and the information is recorded or memorized by an operator and then the exposure is determined in the system by obtaining the minimum density of a shadowed portion if the classified data shows that the average density is high and by obtaining the maximum density of a highlight portion if it shows that the average density is low. In other words, density failure is visually specified so that when the average density is high, the main object is judged to lie in the shadowed portion, and the exposure is judged from the minimum density. However, even if the average density is high, the main object does not necessarily exist in the shadowed portion. When the exposure is determined from the minimum density even if the main object lies in the shadowed portion, it would sometimes be a grave mistake because the minimum density often becomes equal to the fog density of images, and is irrelevant to the main object. In the inspection apparatus disclosed in Japanese Laid-open Patent No. 62428/1977, the position of images is rotated by 90° or 180° to a normal position with a visual determination made by means of switching circuit with a push-button. But this method can merely correct the position of images but cannot obtain correction amounts with respect to the main object.

There have been known (in Japanese Laid-open Patent No. 98821/1973 and No. 62429/1977) methods wherein correction amount is estimated by a visual inspection based upon scanning data to modify the result of an automatic judgement. But such a method requires two operations both in judgement for the necessity of correction and in judgement for the amount, besides skill to achieve a high acceptance rate and processing ability. Moreover, it is extremely difficult to estimate the result of a complex operation in automatic judgement. In order to improve the method to judge the correction amount, it is easily contrived that the data of a scene type (e.g. whether it is taken with strobe, it is open scene, or a show scene) is visually determined for the scenes which are particularly difficult to be judged automatically and the result of automatic judgement is corrected with an amount which has been predetermined for each scene type. Although a film negative with strobe tends generally to be judged to be of insufficient density, some of them have normal or excessive density and they may be over-corrected. Moreover, the scene type data is inconvenient in that definition of scenes is solely dependent on an individual judgement and that a large number of scenes have to be assumed in advance. A strobe scene against white walls in a background may be as different from the one against furniture in a background as to be of an entirely different category. The same is applicable to the relationship between the one against a pitch-dark background and a close-up. The relationship of a main object against a background may widely vary and therefore, the necessary exposure or correction thereof may correspondingly vary by a wide margin.

The conventional automatic judgement methods with an input of a visual inspection result can achieve only limited effect as it is so constructed that an exposure is first judged by an automatic judgement section and when a difficulty is expected, a preset correction amount is supplementary inputted in order to correct the result of the automatic judgement. Furthermore, as the visual judgement data is on the patterns in a film negative and includes no or almost no density data on the main object, the effect of the data is quite limited and can achieve only limited improvement in the acceptance rate. As described above, the level of the automatic judgement method or the automatic judgement method combined with supplemental visual judgement data has not yet reached the stage where prints of a high quality can be produced at a lower cost in a shorter time. At small developing shops, on the other hand, they may need a method which can process films of a high quality and high acceptance rate uniformly by unskilled or inexperienced operators even if it may take a longer time. Therefore, a new photographic printing system which allows cooperation between man and machine has long been sought.

A method which can achieve a high acceptance rate without requiring the skill of operators and apparatus to display film images on a monitor TV and correct exposing conditions have been disclosed (e.g. Japanese Laid-open Patent Application No. 101643/1984, No. 62243/1981 and No. 83733/1981). In all of those methods, images displayed on a monitor TV are corrected to the optimal images manually in a trial-and-error manner to calculate correction in exposing conditions. Since the tolerance range with respect to the correction is wide and since the optimal image conditions on the monitor TV do not always coincide with the optimal printing conditions, the methods still require skill and experience to make the optimal correction. They also are defective in that they need an expensive high-quality display unit as they have to display high-quality images. These methods therefore are put into practice exclusively for professional photographers who earn a higher profit per print sheet and who could thus afford trial-prints.

SUMMARY OF THE INVENTION

The present invention was contrived in view of the aforementioned problems. It is therefore an object of this invention to provide a photographic printer which allows unskilled or inexperienced operators to print images at a high acceptance rate due to the operation at an automatic judgement section and which enables skilled operators to print images at a higher quality and at a higher acceptance rate.

It is another object of this invention to provide a photographic printer which can mitigate fatigue in judging works and can improve processing capacity.

The nature, principle and utility of the invention will become more apparent from the following detailed description when read in conjunction with the accompanying drawings.

DESCRIPTION OF THE PREFERRED EMBODIMENT

Figure 3:
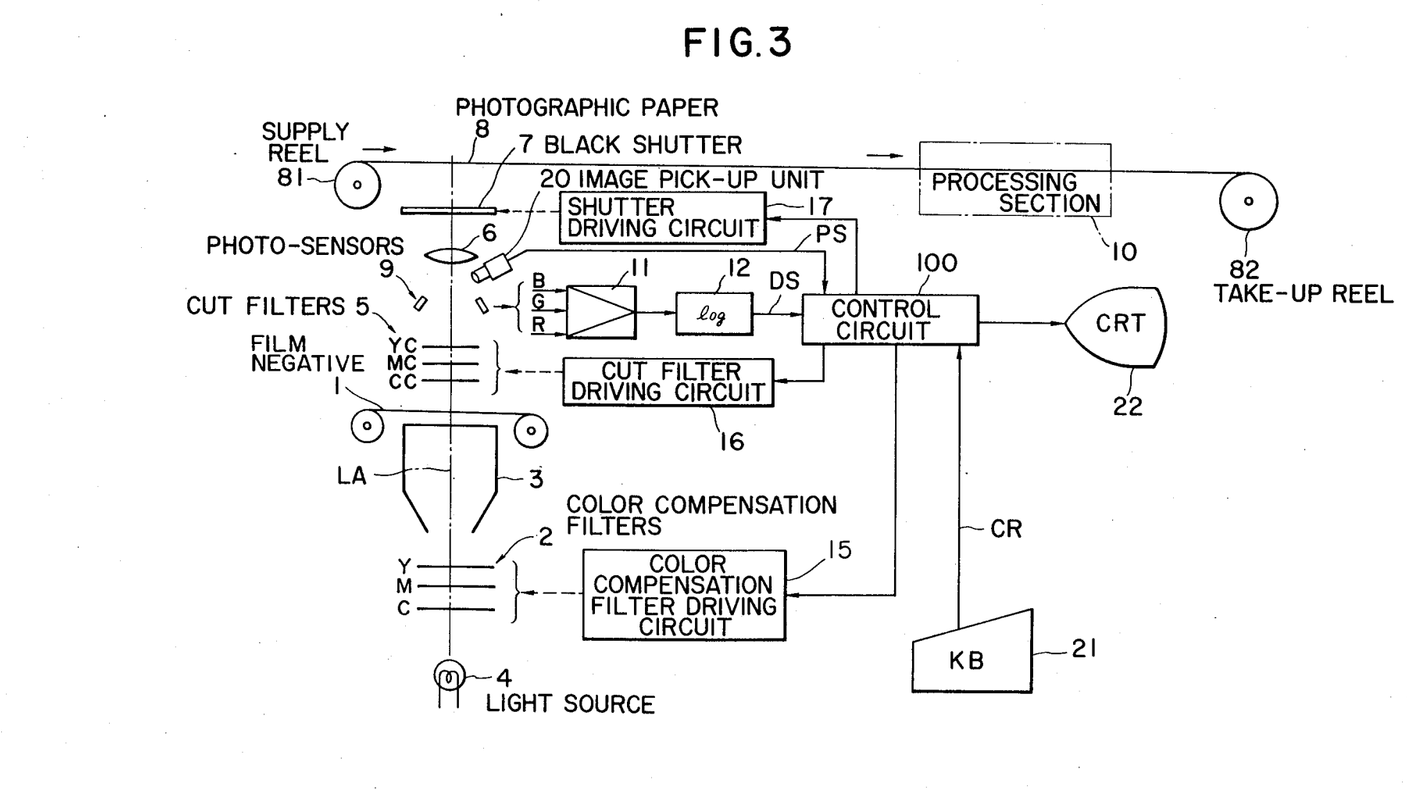
FIG. 3 is a structural view used to show an embodiment of this invention.

FIG. 3 shows an embodiment of a photographic printer of color compensation filter and cut filter type wherein a film negative 1 is illuminated with the light from a light source 4 via color compensation filters 2 of yellow (Y), magenta (M) and cyan (C). The light transmitted through the film negative 1 exposes a photographic paper (color paper) 8 for printing via cut filters 5 of YMC, a lens 6 and a black shutter 7. The photographic paper 8 is wound on a supply reel 81 and the portion exposed to light at the printing section on the light axis LA is to be wound around the take-up reel 82 after developed at a processing section 10. Near the lens 6 are provided photo-sensors 9 such as photo-diodes for detecting image density in three primary colors of blue (B), green (G) and red (R). The detection signal from the photo-sensors 9 is amplified by an amplifier 11, converted to a density signal DS by a logarithmic converter 12 and inputted to a control circuit 100 to determine printing conditions by a means which would be described hereinafter. The color compensation filters 2 are controlled via a color compensation filter driving circuit 15, the cut filters 5 are controlled via a cut filter driving circuit 16 and the black shutter 7 is controlled via a shutter driving circuit 17 so that the film negative which has been conveyed to the printing section is printed on the photographic paper 8 and processed for bleaching, fixing, washing and drying.

Figures 4, 5A:
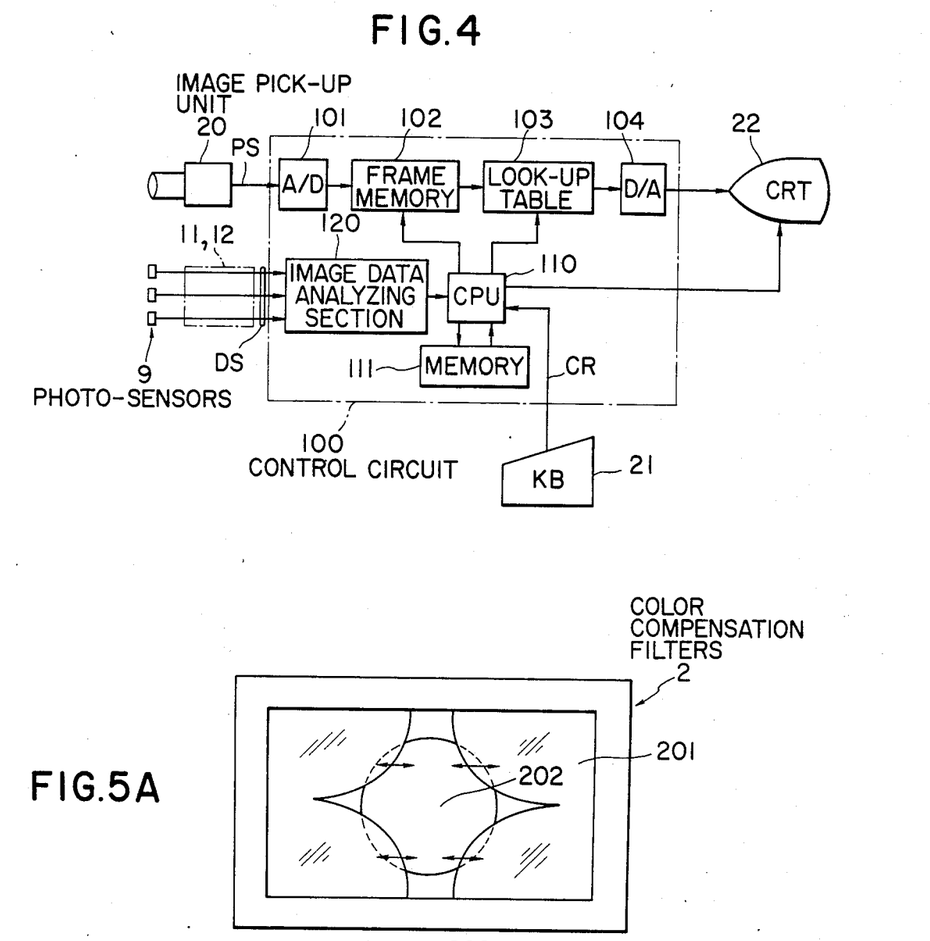
FIG. 4 is a block diagram used to show a portion thereof.
FIGS. 5A and 5B are structural views of a filter.
Figure 5B:
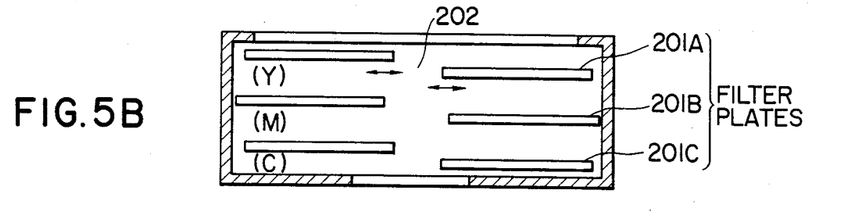

The color compensation filters 2 may have the structure shown in FIGS. 5A or 5B wherein four filter plates 201A through 201C, each being a substantial quadrant section, are combined respectively for the three colors; i.e. yellow (Y), magenta (M) and cyan (C). By laterally moving a pair of filter plates, the amount of light transmitting through the central path 202 can be controlled for each color. The movement of filters 201A through 201C for respective colors can be controlled by the color compensation filter driving circuit 15. Each filter plate 201A through 201C has approximately the spectral transmittance distribution of a film negative dye so as to print images at a high quality.

An image pick-up unit 20 for picking up the images on the film negative 1 (e.g. a camera, an image sensor comprising CCD's etc.) is provided near the axis LA of the film negative 1 and the image signal PS is inputted into the control circuit 100. The images on the film negative photographed by the image pick-up unit 20 are displayed on a CRT 22 in the state printed in accordance with a standard exposure expression (which will be described hereinafter) and correction signals CR from a key input unit 21 are inputted to the control circuit 100. FIG. 4 shows the detail of the control circuit 100 wherein an image signal PS from the image pick-up unit 20 is converted to a digital value by an A/D converter 101, and stored in a frame memory 102. Every time that image signals for one frame are stored in the frame memory 102, the data thereof is read out, inputted in a look-up table 103, processed for negative/positive conversion, gradation conversion, etc. in accordance with a preset table, converted again into an analog value by a D/A converter 104 and outputted to the CRT 22. The optical measurement data from the photosensors 9 is inputted to an image data analyzing section 120 as a density signal DS via the amplifier 11 and the logarithmic converter 12 the analyzed data is inputted to the CPU 110. The CPU 110 is connected to a memory 111 so as to control timing at the frame memory 102 and the look-up table 103 as well as to control the brightness and the tone of the displayed image on the CRT 22 according to the result of the operation.

The CRT 22 may be other flat-type display unit such as LCD or electro-luminescent type and may be either color or a black-and-white display. The display unit may not be connected to a printer and if connected, the film negative may be displayed within a printing gate or at a location one to several frames before. The unit may display either one frame or several frames at a time and if it is to display plural frames, it may display a series of images at the same time; images which have been judged with the images not yet judged, the judged images and a reference image, images at different densities and colors, the images without retouching and the same images but already retouched or the images at different magnifications, etc. The data (e.g. selection) of these plural images may be inputted from a keyboard or by means of a write-pen or a mouse. Furthermore, in the correction of the image density by the control circuit 100, the amount of incident light to the image pick-up unit 20 from the light source 4 may be changed by adjusting the aperture of the lens 6, the intensity of the light from the source or the filters.

Figure 6:
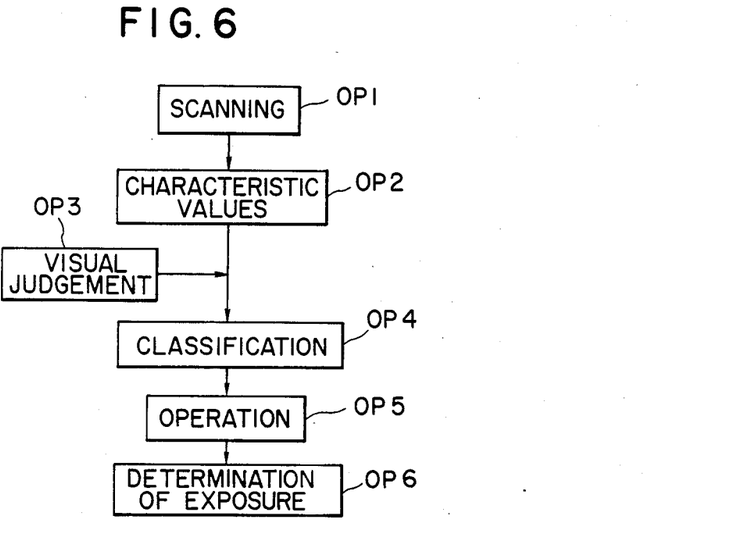
FIG. 6 is a flowchart used to show an example of the operation of this invention.

FIG. 6 shows the operational flow of this invention. The film negative 1 is segmented into a large number of small picture segments for scanning with photo-sensors 9 (OP1). By the scanning OP1, the image data analyzing section 120 obtains the characteristic values of one frame of the negative film 1 such as LATD, the highest density or the lowest density and inputs this data to the memory 111 (OP2). The film negative 1 is simultaneously classified visually on the CRT 22 by an operator (OP3). Before visual classification, the negative images of the film negative 1 has been converted to positive images and displayed in accordance with the standard exposure expression on the CRT 22. The classification operation (OP4) of the film negative may be performed with the data from the visual judgement (OP3) or with the characteristic values (OP2) obtained by the scanning (OP1). At the step of classification (OP4), a prescribed expression for determining exposure is selected by a key input unit 21 and the exposure is determined by the thus selected expression with the characteristic value OP2 (OP6). In other words, the image on the film negative 1 is displayed on the CRT 22 at the image density (luminance) corresponding to the printing density calculated by the first expression or in accordance with the standard expression. Then, if the image which is actually displayed should be reduced or increased in exposure from the standard exposure, such correction is made by inputting from the key input unit 21 the value of increase or decrease to select the most suitable operation expressing from correction expressions or exposure determining expressions (the second expression) which have been stored in the memory 111 in advance. Finally, the exposure or the correction is obtained in accordance with the selected expression.

The standard exposure expression is a functional expression of values which represent density of the whole surface of a frame of images and/or a partial surface thereof. They may be average density of a frame, frame density of central critical points, frame density of selected portions, the maximum density, the minimum density or the average density on center, etc. The correction expression used is an expression to calculate the correction required for the exposure obtained by the standard expression while the exposure determining expression is the one used in place of the standard expression to obtain a more accurate exposure or to obtain the result equivalent to the sum of the standard and the correction expressions. Those expressions are also functional expressions of values representing the whole and/or partial surface density. If the result of the correction is not acceptable or NG, the operator should select another key or repeat input of the same key to have another corrected image displayed. The result of the correction may be displayed on the CRT 22 and if correction is performed very accurately, the display of the result may be omitted to save time and cost. The correction and exposure once determined are stored in the memory 111 temporarily or used directly in exposure control. If the display and the printer are not integral, the values may be recorded in a recording medium such as paper tape or magnetic tape, and then inputted to the printer via these media.

The key data at the step OP3 of visual judgement in the data for correcting the exposure determined by the standard expression. Correction buttons (or density keys) of 10 to 15 stages are prepared, each stage differing from another in gradation by 15 to 30% in exposure. It is better to prepare six or less stages (preferably 4 or less) each of which differs from next stage by at least 60% or more (preferably 100% or more) in order to allow unskilled operators to process at high speed and at a high acceptance rate. For the operation expression at OP5, a known expression such as the one disclosed in Japanese Laid-open Patent Application No. 28131/1979 and No. 23936/1977 may be used. Coefficients and characteristic values in prescribed expressions are different for each class differentiated by OP4. More particularly, images are roughly classified for exposure correction at the step OP3 or at the visual judgement and more accurate correction or the exposure is computed with characteristic values (OP2) obtained by the scanning (OP1).

Figure 7A:
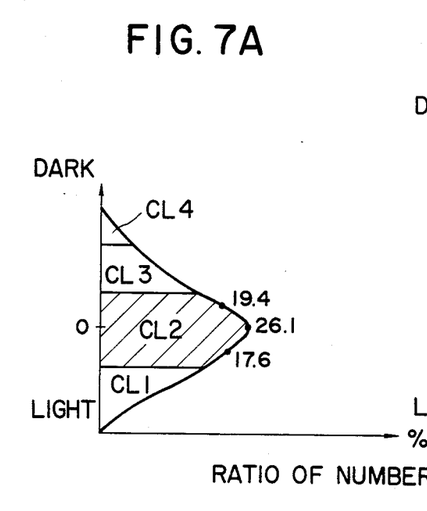
FIGS. 7A, 7B and 8 graphs used to explain examples to prints made by this invention.

FIG. 7A relates to the relationship between the classes judged at the visual judgement OP3 and the selection of the prescribed expression. The standard expression using (from a through d) are stored in the memory 111 in advance, and one is selected in correspondence with the result of classification CL1 through CL4. For instance, if the type of a film negative 1 lies in the area of CL3, the expression c is selected from computing exposure. The characteristic value OP2 obtained by the scanning OP1 is substituted in the expression c and with the exposure thus obtained, the film negative 1 is exposed on the photographic paper 8. While, as shown in FIG. 2, the change in exposure is fixed to a class (correction key) in the prior art method, the change in exposure can be variable with respect to a class by +30% or more according to the types of objects or in accordance with operation expression in this invention.

The acceptance rate is shown below in the case to which the above method is actually applied. The reason why the correction ranges are overlapped is to enlarge the tolerance range of erroneous judgement.

|  | acceptance rate |  |
|---|---|---|
| Object group (i) which is assumed to need the correction ≦ −30% | 95.1% | → expression a |
| Object group (ii) which is assumed to need −50% < correction ≦ +50% | 93.8% | → expression b |
| Object group (iii) which is assumed to need +30% < correction ≦ +130% | 90.3% | → expression c |
| Object group (iv) which is assumed to need +110% < correction | 95.7% | → expression d |
| Total | 93.8% |  |

Since the acceptance rate achieved by the prior art method even by skilled operators was 91.4%, it is obvious that this invention method can attain higher acceptance rate as well as higher quality than the judgement visually made on all the samples. The invention method has another advantage in that an operator can judge images simply by watching positive images displayed on the display unit and does not have to estimate the result of printing from negative images as was required by the prior art, and hence does not need special experience nor skill to make an accurate judgement. The method enables one to reduce the influence on the judgement otherwise caused by individual difference among operators.

As mentioned above, the ranges covering operation expressions (expressions a through d) are made to overlap in order to achieve accurate calculation even if slight judgement is made in classification by visual As mentioned above, the ranges covering operation expressions (expressions a through d) are made to overlap in order to achieve accurate calculation even if slight judgement is made in classification by visual judgement at OP3, which result in less errors. Compared to the prior art manipulation of density keys each of which differs from next key by 15 to 30% or gradated correction shown in FIG. 1, this invention method computes exposure in accordance with the operation expression directly related to objects, thereby improving precision, reducing fluctuation in density otherwise caused by erroneous correction, and producing prints of a high quality. This invention methos does not require the correction of the displayed images to the optimal images by operators, thereby removing the possibility of fluctuations caused by individuals or units. Furthermore, this invention method needs a smaller amount of samples to be judged (classification) and yet can achieve a better performance.

The above description was made based on the correction to be made for exposure in order to facilitate explanation, but the object group (i) may be classified as the scene where exposure should be lowered, the group (ii) as the scene where correction does not have to be made, the group (iii) as the scene where correction should be increased, and the group (iv) as the scene where exposure should be greatly increased.

Figure 7B:
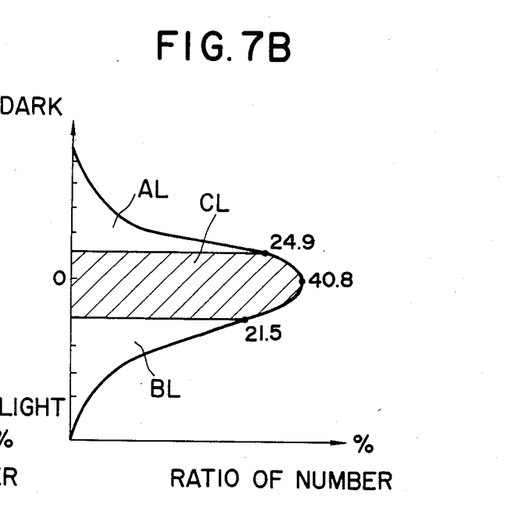
Figure 8:
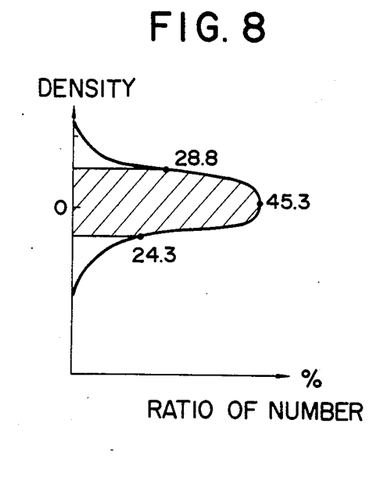
Figure 9:
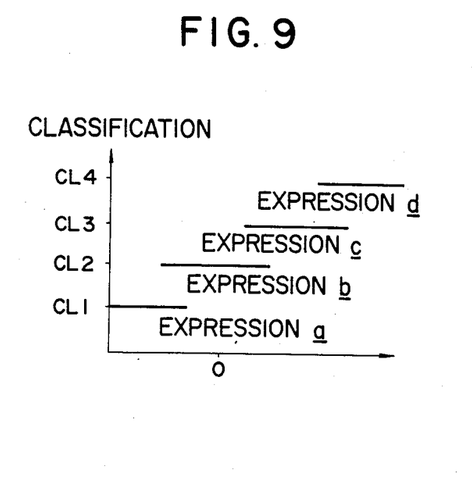
FIG. 9 is a chart used to show the principle of this invention.

Referring now to FIGS. 7B and 8, the method to display the result of the first expression on the CRT 22 and to use the second expression depending on the result will be described more in detail. FIG. 7B shows the result of the first operation expression where whole frame surface average density, partial surface frame density and color data are used in operation in the manner disclosed in Japanese Laid-open Patent Application No. 28131/1979, and the resultant image are displayed.

The area AL in FIG. 7B shows the portion where displayed images are too dark, the area BL the portion where they are too light, and the hatched portion the images are acceptable, which accounts for 87.2% of the whole. Based on the above, the data CR or "too dark" and "too light" on the areas AL and BL respectively are inputted from the key input unit 21. A part of the hatched area CL may possibly be judged either too dark or too light but the judgement on areas AL and BL would not be mistaken. Therefore, only two correction or the exposure determining expressions or more particularly the two expressions covering the area (AL+CL) and the area (BL+CL) would suffice. FIG. 8 shows the result of correction. Although there remains about 1.6% of rejection, the figure is almost negligible in practice where a printer may have larger allowance. It can be said that almost a 100% acceptance rate was attained. If this invention method is adapted, the operator does not have to correct displayed images optimally in a trial-and-error manner but simply judges whether or not an image is acceptable, or too dark or too light. This method does not need display units of high precision. The number of necessary judgements is small, and special skill is not required as operators directly observe the images. A 100% or almost 100% acceptance rate can be attained unless operators judge conversely and input wrong data. Compared to the example in FIG. 7A, the volume of corrections or the scope thereof becomes one half, facilitating the process and improving the precision.

Figure 10:
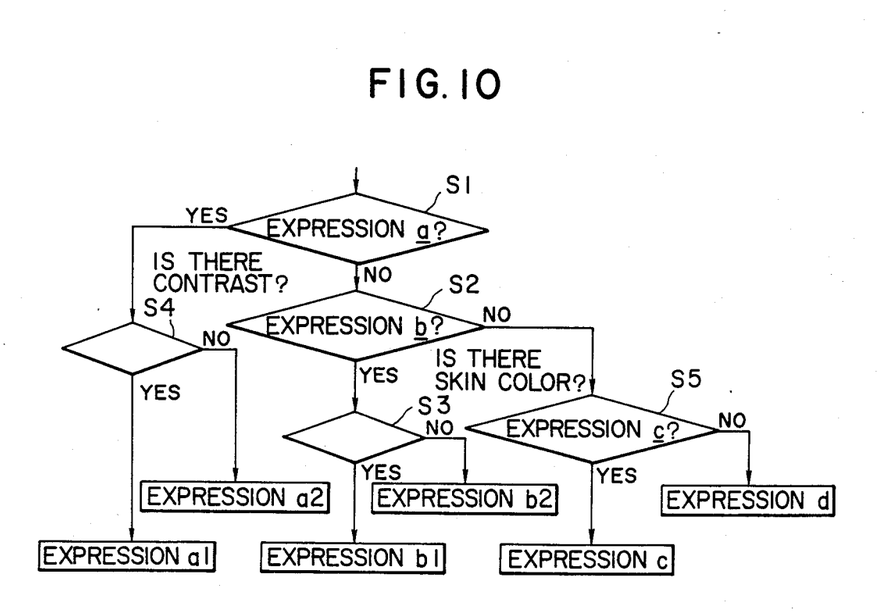
FIG. 10 is a flowchart for selecting an expression according to this invention.

As mentioned above, the exposure or correction thereof is generally determined empirically from the relationship between the main object and the background and this empirical judgement is brought into the correction work in the prior art to cause individual differences and difficulty in judgement. This invention method solved the problem by applying visual judgement only to classification at the step OP3. This method can attain high acceptance rate without requiring such a high precision in classification. Scenes having a similar relationship in density between objects and background can be gathered by using the classification data which corresponds to the exposure correction. Or using such data, one can detect where the main object lies; for instance, in FIG. 7A, the reduction of correction implies that the main theme exists mainly in shadowed area, thereby extremely improving the precision of operation within the control circuit 100. If scanning data should be used in classification besides the visual judgement data, the characteristic values may include contrast data, frame position density data (e.g. the density at center of the frame), data about skin color, color data of frame, and data on necessary or unnecessary area. The precision in correction can be further improved and the number of classes for visual judgement can be reduced by using classification according to the above data. FIG. 10 shows an example of processing where contrast data and complexion data are used. More particularly, the expression a is divided into a1 and a2 by the presence/absence of contrast while the above expression b is similarly divided into b1 and b2. After the formula a is selected at step S1, the presence/absence of contrast is judged (Step S4) and if there is contrast, expression a1 is selected and if there is no contrast, expression a2 is used. Similarly, at Step S2, after the expression b is selected, the presence/absence of complexion is judged (Step S3), and if there is color of skin, B1 is used while if there is no skin color involved, B2 is selected. At Step S5, the expression c or d is selected.

The correction exposure data (or the degree of correction) as against the exposure determined standard expression is used as a visual judgement data CR by the key input unit 21 and as mentioned above, the fluctuation in judgement made by skilled operators ranges about ±50%, while that an extremely simple display unit is used and the whole frame and partial frame densities are used in the correction expression, the precision in judgement by unskilled operators remain in the range similar to the above. The data below shows the result of an experiment made on 2000 frames where the values ±30% of the optimal value is accepted. As the standard expression, the frame average density is used, and as the exposure correction expression, the whole frame and partial frame densities are used.

| Class A | | Acceptance Rate |
| --- | --- | --- |
| (a) The group which is assumed to need correction < −30% | | 95.1% |
| (b) The group which is assumed to need −40% < correction < +40% | | 96.5% |
| (c) The group which is assumed to need +30% < correction < +120% | | 92.0% |
| (d) The group which is assumed to need +110% < correction | | 95.7% |
| | Total | 96.5% |

| Class B | | Acceptance Rate |
| --- | --- | --- |
| (a) The group which is assumed to need correction ≦ −30% | | 95.1% |
| (b) The group which is assumed to need −50% < correction ≦ +50% | | 93.8% |
| (c) The group which is assumed to need +30% < correction < +130% | | 90.3% |
| (d) The group which is assumed to need +110% < correction | | 95.7% |
| | Total | 93.8% |

| Class C | | Acceptance Rate |
| --- | --- | --- |
| (a) The group which is assumed to need correction < 0% | | 92.0% |
| (b) The group which is assumed to need −60% < correction < +60% | | 91.8% |
| (c) The group which is assumed to need +20% < correction < +140% | | 88.7% |
| (d) The group which is assumed to need +100% < correction | | 92.1% |
| | Total | 91.5% |

The Class A represents the case where displayed images can be accurately judged while Classes B and C represent the case where unskilled operators judge images at inferior precision and therefore, the judgement standard should be defined with correction. The case of Classes A through C is determined by operators and with image display units. As in Class A, the result of printing is displayed in images as it is, the definition of group or differentiation among groups can be performed at higher precision than the prior art. In Classes B and C, the precision in definition or differentiation among groups is lower than the prior art. Skilled operators rate 91.4% of acceptance in the prior art method. In Class A, prints with higher quality than the prior art can be produced. This is almost a 100% acceptance rate in practice. Even unskilled operators can achieve performance almost as good as skilled operators if they use the operation expression with the scope of correction which falls under Class C. If a functional expression with the frame average density, the maximum density, the minimum density, etc. is used as the standard expression, as described in relation to FIG. 7B, a higher acceptance rate and simpler judgement than above examples can be attained. Image analysis of high precision, however, is necessary in this case.

Figure 11:
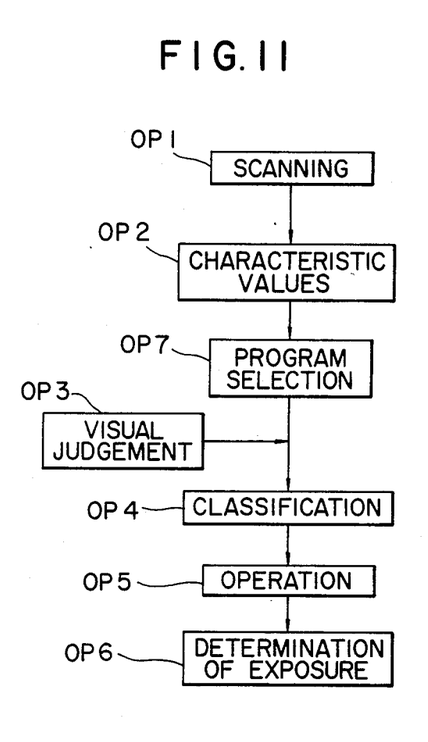
FIG. 11 is a flowchart used to show another processing example of this invention.
Figure 12:
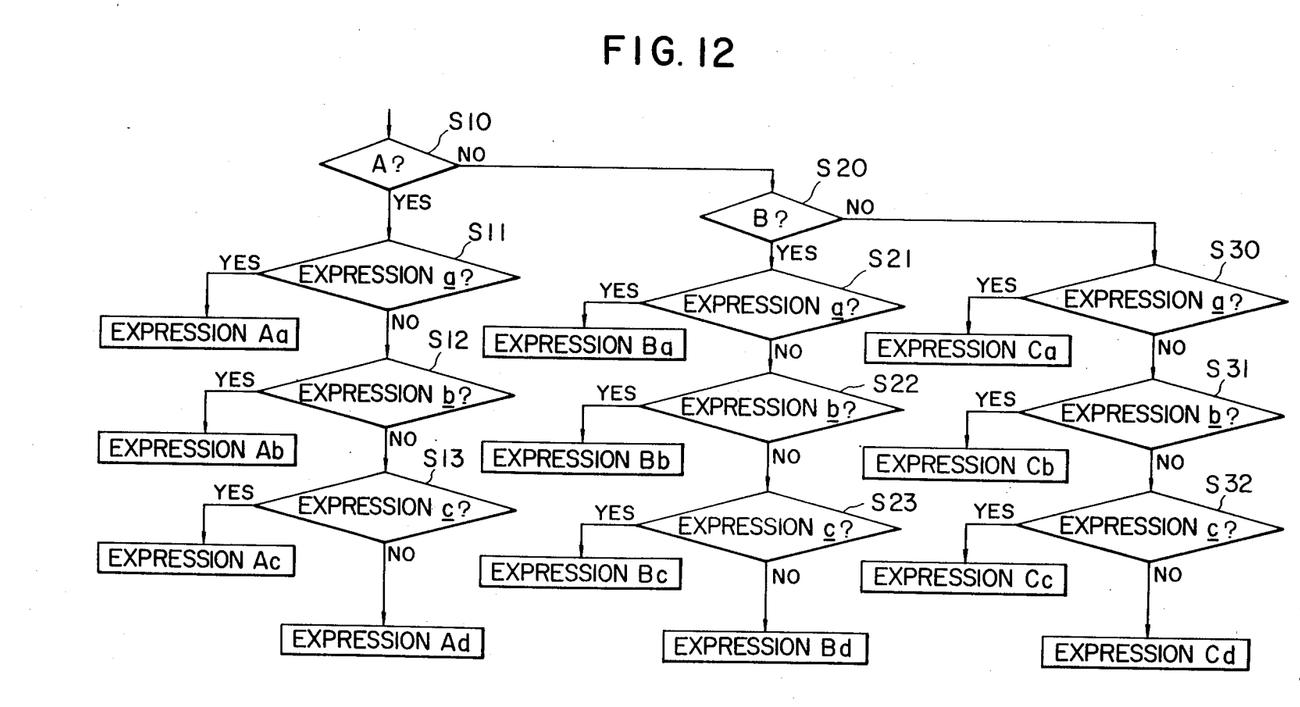
FIG. 12 is a flowchart used to show an example of the operation thereof.

In order one to solve the above problem, this invention method enables to select a program for classifying film negative depending on the degree of skill of operators in charge of visual judgement OP3 of the negative film 1 as FIG. 11 shows. If modes of Classes A through C are selected and inputted by a key input unit 21 before printing work, an operation expression most suitable to the operator in charge is selected from the memory 111 to determine exposure. FIG. 12 shows the procedure wherein a skilled operator selects one from the operation expressions Aa through Ad at Steps S11 through S13 to determine the exposure. Unskilled or inexperienced operators select one expression from expressions Ca through Cd depending on the correction within the scope determined by Class C to compute exposure. Those who have the skill somewhere between skilled and unskilled designate the Class B and select one of the expressions Ba through Bd to determine the exposure. In formulation of the programs, an operation formula Aa is calculated for the sample group of optimal correction < −30% with statistical method. Expressions Ab and Cd are obtained similarily. The operation expression may be those disclosed in Japanese Laid-open Patent Application No. 28131/1979.

Simply by changing the program in the order from C→B→A depending on the skill of an operator in above mentioned Classes A through C, the method can be used by users of various qualifications and operators with wide range of skill.

In order to use the method at a high automatic judgement rate as shown in FIG. 7, the standard expression should be those disclosed in Japanese Laid-open Patent Application No. 23936/1977 and No. 28131/1979. All of them obtain operational expressions statistically, the result of which shows the tendency shown in FIG. 13. More particularly, in the graph, the lateral axis represents correction, the distribution of correction is expressed by the characteristic curve III, and the NG rate is low when the correction distribution is high, and the NG rate becomes high when the correction distribution is low. The operational expression is optimized by statistical means as above, and therefore, the operational result is good around the correction [0] where the number of samples is largest. The correction range to produce a high acceptance is from [−2] (−50%) to [+2] (+50%) which accounts for 87.2% of the whole or the hatched area in FIG. 13. If correction is made to the remaining 13% at a good precision, it would suffice.

Figure 13:
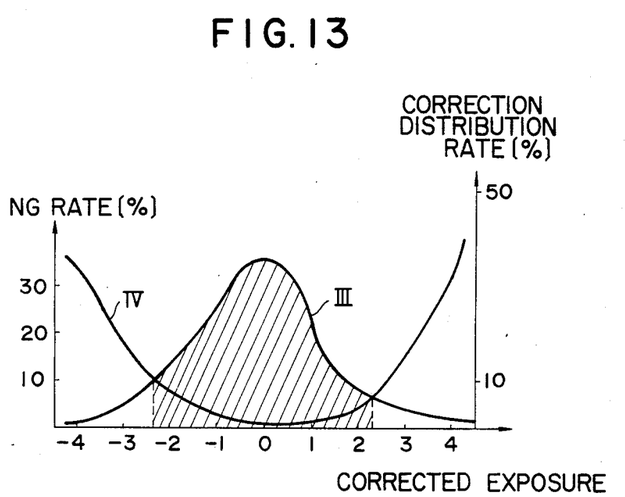
FIG. 13 is a graph of characteristics used to show the difference between automatic judgement and manual judgement.
Figure 14:
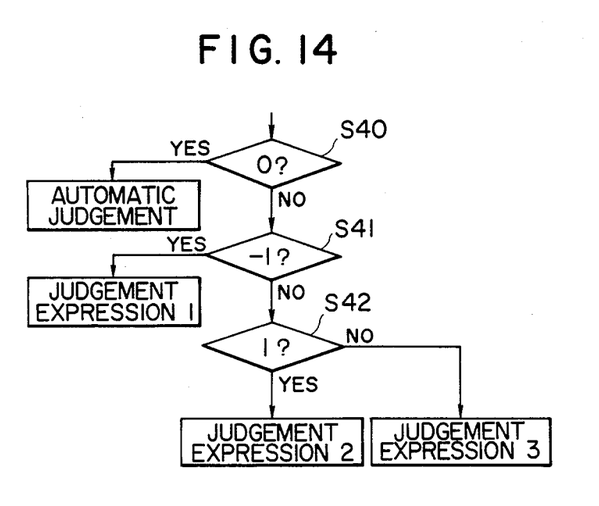
FIG. 14 is a flowchart used to show another example of processing by this invention.

It is possible to divide the film negative 1 into two groups one of which is optically measured by photosensors 9 to automatically determine the exposure at printing and the other is determined for printing exposure by computing measurement data based upon the classification made by visual judgement inputted from the key input unit 21. The hatched area in FIG. 13 may be the only area which is the object of automatic judgement. FIG. 14 shows such processing wherein when the flag for classification is [0] the group is judged to be automatically judged while when the flag is [−1] it is judged as the group which requires increase in correction exposure and expression 1 is selected. When the flag is [1], it is judged as the group which needs increase in correction exposure, and the expression 2 is used. When the flag is other than [1], for instance [2], it is judged as the group which needs large increment in correction to select the expression 3. With the aforementioned procedure, it becomes possible to determine optimal exposure taking into account the correction distribution as shown in FIG. 13. If other judgement expression such as the expression 1 for the group which needs [correction exposure $<-1$ ($-30\%$)], the one 2 for the group which needs [$+1$ ($+30\%$)$<$correction$<+6$ ($+130\%$)] or the expression 3 for the group which needs [correction exposure$<+5$ ($+110\%$)] is used, judging performance is extremely enhanced. This is attributable to that the classification data (visual judgement data) CR is directly related to the main object and background, errors thereof is small, and scenes having similar relation between main objects and background are gathered. With less visual judgement data, even in experienced operators can achieve a high acceptance rate in printing.

This invention is applicable to still other procedures. For instance, the exposure may be determined with an operational expression (either first or second expression) by inputting the visual judgement data CR, segmenting a frame to a large number of small areas and photographically measuring the areas, obtaining characteristic values (or volumes) from the photographic measurement data with data CR and using the characteristic values obtained from the above data in relation to the operation. The visual judgement data CR may include data such as the main object is darker, equal to, or higher in density than highlights, medium, shadow, or average area (or a specified point), that unnecessary area is darker, equal to, or lighter in density than highlights, medium, shadow or average area (or a specified point), or the data to increase correction exposure, the data of unnecessary area or the data to decrease, etc. As the characteristic volume to be influenced by the visual judgement data Cr, there are used contrast data, the maximum density data ($D_{max}$) or the minimum density data ($D_{min}$), the average density data, etc. For instance, with the visual judgement data that the main object lies in the shadow, the values beyond the maximum density is clipped off and the maximum density is defined anew with the histogram. In the calculation of $\Sigma|D_{i+1}-D_i|/n$, the portion of $D_{min}+\alpha\cdot(D_{max}-D_{min})<D_i$ is removed. The average density data may include the average density data of the clipped off portion in the histogram, the average density below $D_{min}+\alpha\cdot(D_{max}+D_{min})$, and the average density which is $(D_{max}+D_{min})2<D_i$ except for the density points of $|D_{i+1}-D_i|<\alpha$ ($\alpha=0.10$). Other average density usable is the average density which is obtained by omitting densities on each scanning line on objects unit the occurrence of $(D_{i+1}-D_i)<\beta$ (for example, $\beta=0.20$) and searching from the four sides of a frame of a film negative to find a remaining one, the average density obtained by removing density points on the periphery of film negative which is above a certain value (for instance 1.0) or the average density obtained by removing the density points at the central portion which is above a certain value (e.g. 1.0). The complexion data may include the average density of the point judged the color of skin is smaller than $\beta$ in density if it lies in shadow, or $\beta=D_{min}+0.7\times(D_{max}-D_{min})$, for example, or the minimum density of the area which is judged complexion or a value close thereto. Color data may include the data to expand the domain of a neutral color, the data to remove the number of white colors which are less than a certain value (e.g. 0.7) from the numeration, the clipping data such as when LATD (R)-(G)$>0.20$, the value should be 0.20, etc. The area data may include the areas of main objects or unnecessary area, the area of $|D_{i+1}-D_i|<\alpha$, when the main object exists in the shadow area, the area of $D_{min}+\alpha\cdot(D_{max}-D_{min})<D_i$, when the main object does not exist in the shadow area, the area of $D_{min}+\alpha\cdot(D_{max}-D_{min})>D_i$, etc.

As described in the foregoing, this invention method enables operation at a higher precision because the density area where the main object exists can be examined minutely with the visual judgement data of the frame displayed on the CRT 22 while the characteristic volumes in the prior art are obtained from the whole area of a frame as the main object is not estimated, thereby achieving a higher correlation between the characteristic values and the density of a main object. If it is detected that the main object exists in the shadow area of the images, the data on the highlight area is not necessary and characteristic volumes should be obtained from the area except for the unnecessary area.

The above mentioned photographic printer may include an enlargement function at image display, image measurement unit and/or printer. The film negative (or a film positive) may be conveyed manually or automatically while observing the displayed images or may be automatically suspended by specifying a certain frame. Similar function may be included for color correction, too. For instance, the addition of a color such as reddish, bluish or yellowish addition can be specified, or the light source can be specified such as indoors, artificial light or evening light. The amount of light may be obtained with these data by operation. The photographic measurement data is not necessarily obtained from the photo-sensors 9 but may be obtained from the image signals PS from the photographic unit. When a frame is detected to be under-exposured, overexposed, fogged, images out of the frame, out of focus, etc. and is judged not to be printed at a good quality, such information may be displayed on a display screen. The recording material may be photo-sensitive material such as color photographic paper, black-and-white photographic paper, etc., magnetic material such as video tape, a video disc, a magnetic disc, heat-sensitive material, an ink jet, electrophotography, pressure-transfer paper, etc. Objects may be imaged on color negative/positive film, black-and-white film, video tape, video disc, etc. The direction of correction may be inputted as a visual data as mentioned above. The correction amount needed to optimize the displayed images may be used as a classification data or the exposure operation data. Instead of inputting visual data with keys, with a write-pen or a mouse, the position of a specified image or a specified object (for example, a face of human) may be inputted. In such a case, whether the density of the specified position on the displayed image (luminance) is lower or higher than a preset value is automatically judged and the result of the judgement is used as a classification data similarly to determine the exposure. Another method to obtain visual data is to display images having different densities and colors and to select an image judged most preferable by operator for key input.

As described in the foregoing, this invention enables to input information simply and yet accurately without necessity of skill as data is inputted following the image display in a manner to allow any unskilled operator easy judgement. The result of printing can be easily estimated from the display of the determined exposure and if the result is not acceptable, other data may be additionally inputted in order to facilitate selection of optimal data. It does not require image display of high picture quality, and yet can achieve high speed input (or correction). This invention method can automatically obtain precise exposure for printing by means of a present operational expression formed on the input data by inputting correction method or rough correction of display images. In the prior art visual judgement method to determine exposure for printing, one has to observe a film negative and to assume the direction of correction for printing with standard exposure (e.g. exposure based on LATD) or to store the pattern. This invention dose not need such complicated procedure but allows even a beginner to use the method as the result is displayed, the operator can ascertain and understand the result with his own eyes. This invention method may therefore be used effectively even at a shopfront or an unattended printing stand where a customer can print his own film negative by himself the characteristics differ between the image display unit and the photo-sensitive material, the range which is visually allowable on a CRT is twice as wide as the one of a photographic print. Therefore, even if images are produced within an allowable range on the display to obtain the right exposure, that does not necessarily mean that a good print can be produced. In order to solve the problem, it is necessarily to include an image display unit of a higher precision, as well as sufficient color and density correction and compensation and skill of operators. This invention method needs none of them.

It should be understood that many modifications and adaptations of the invention will become apparent to those skilled in the art and it is intended to enhance such obvious modifications and changes in the scope of the claims appended hereto.

What is claimed is:

1. A photographic printer comprising:
    an image pick up unit for picking up an image of a film to be printed;
    an image photometric measuring means for photometrically measuring the image of the film in a large number of segments;
    a display means for displaying the image of the film according to image signals outputted from said image pick up unit at a brightness level obtained by using an exposure amount calculated with a first exposure amount operational formula according to image signals outputted from said image photometric measuring means;
    a key input means for inputting a classification information of the image of the film according to a visual inspection of the displayed image so as to select one of the plurality of second exposure amount operational formulas;
    an image data analyzing means for obtaining image characteristic values from image data transmitted from said image photometric measuring means;
    an operational means for determining a printing exposure amount, which comprises a means for obtaining a correction amount by substituting said image characteristic values for the selected second exposure amount operational formula and a means for obtaining the printing exposure amount by adding said correction amount to exposure amount calculated with the first exposure amount operational formula; and
    an exposure control means operatively connected to said operational means for exposing a photographic paper according to the determined exposure amount.

2. A photographic printer as claimed in claim 1, further comprising a memory for storing said plurality of second exposure amount operational formulas.

3. A photographic printer as claimed in claim 1, wherein said image photometric measuring means includes a sensor.

4. A photographic printer as claimed in claim 1, wherein said image pick up means is a camera.

5. A photographic printer as claimed in claim 1, further comprising a color compensation means which comprises a yellow filter, a magenta filter and a cyan filter for respectively controlling the amount of red, green and blue light and which controls light inputted into said image pick up means and said image photometric measuring means so as to be suitable for photometric measuring.

6. A photographic printer as claimed in claim 1, wherein said key input means inputs said classification information of two types representing a dark density and a light density with respect to said displayed image.

7. A photographic printer as claimed in claim 1, wherein said key input means inputs said classification information of three types representing a dark density, a suitable density and a light density with respect to said displayed image.

8. A photographic printer as claimed in claim 1, wherein said key input means inputs said classification information of a plurality of graded types representing very dark and dark densities, a suitable density and very light and light densities with respect to said displayed image.

9. A photographic printer as claimed in claim 1, wherein said image characteristic values are obtained from the image data of a whole film frame.

10. A photographic printer as claimed in claim 1, wherein said image characteristic values are obtained from the image data of a part of a film frame.

* * * * *